United States Patent
Sigurdsson

(10) Patent No.: US 9,567,969 B2
(45) Date of Patent: Feb. 14, 2017

(54) SYSTEMS AND METHODS FOR TRANSPORTING WIND TURBINE BLADES

(71) Applicant: BNSF Logistics, LLC, Springdale, AR (US)

(72) Inventor: Sigurd Ernir Sigurdsson, Bothell, WA (US)

(73) Assignee: BHSF Logistics, LLC, Springdale, AR (US)

( * ) Notice: Subject to any disclaimer, the term of this patent is extended or adjusted under 35 U.S.C. 154(b) by 0 days.

(21) Appl. No.: 14/796,405

(22) Filed: Jul. 10, 2015

(65) Prior Publication Data

US 2016/0017861 A1    Jan. 21, 2016

Related U.S. Application Data

(60) Provisional application No. 62/026,324, filed on Jul. 18, 2014.

(51) Int. Cl.
| | | |
|---|---|---|
| *B60P 7/08* | (2006.01) | |
| *F03D 1/00* | (2006.01) | |
| *B60P 3/40* | (2006.01) | |

(52) U.S. Cl.
CPC ............. *F03D 1/005* (2013.01); *B60P 3/40* (2013.01); *Y02E 10/721* (2013.01)

(58) Field of Classification Search
CPC .......... B60P 3/40; F03D 1/005; Y02E 10/721
USPC .............. 410/144, 145, 120, 32, 34, 35, 53; 280/404; 414/460
See application file for complete search history.

(56) References Cited

U.S. PATENT DOCUMENTS

| | | | |
|---|---|---|---|
| 4,150,628 | A | 4/1979 | Keldenich |
| 7,591,621 | B1 | 9/2009 | Landrum et al. |
| 7,670,090 | B1 | 3/2010 | Landrum et al. |
| 8,096,739 | B1 | 1/2012 | Landrum et al. |
| 8,142,120 | B2 | 3/2012 | Landrum et al. |
| 8,192,117 | B1 | 6/2012 | Landrum et al. |
| 8,366,361 | B1 | 2/2013 | Landrum et al. |
| 8,382,407 | B1 | 2/2013 | Landrum et al. |
| 8,500,378 | B1 | 8/2013 | Landrum et al. |
| 8,529,174 | B1 | 9/2013 | Landrum et al. |
| 8,641,339 | B2 * | 2/2014 | Schibsbye ................ B60P 3/40 410/45 |
| 8,708,625 | B1 | 4/2014 | Landrum et al. |
| 8,834,082 | B1 | 9/2014 | Landrum et al. |
| 2011/0131785 | A1 | 6/2011 | Madsen |

(Continued)

FOREIGN PATENT DOCUMENTS

WO    2011098086 A1    8/2011

OTHER PUBLICATIONS

International Searching Authority, International Search Report, International Application PCT/US2015/040093 filed under the Patent Cooperation Treaty, Jul. 13, 2015.

*Primary Examiner* — Stephen Gordon
(74) *Attorney, Agent, or Firm* — James J. Murphy; Daniel R. Brown

(57) ABSTRACT

A system for transporting a wind turbine blade includes a first support subsystem disposed on a first movable platform, which allows a first point on the wind turbine blade to pivot in response to the first movable platform traversing a curve. A second support subsystem is disposed on a second movable platform spaced, which allows a second point of the wind turbine blade to move laterally in response to the pivoting of the first point on the wind turbine blade on the first movable platform.

19 Claims, 17 Drawing Sheets

(56) References Cited

U.S. PATENT DOCUMENTS

2012/0091080 A1 4/2012 Kelly
2013/0343827 A1 12/2013 Schibsbye et al.

* cited by examiner

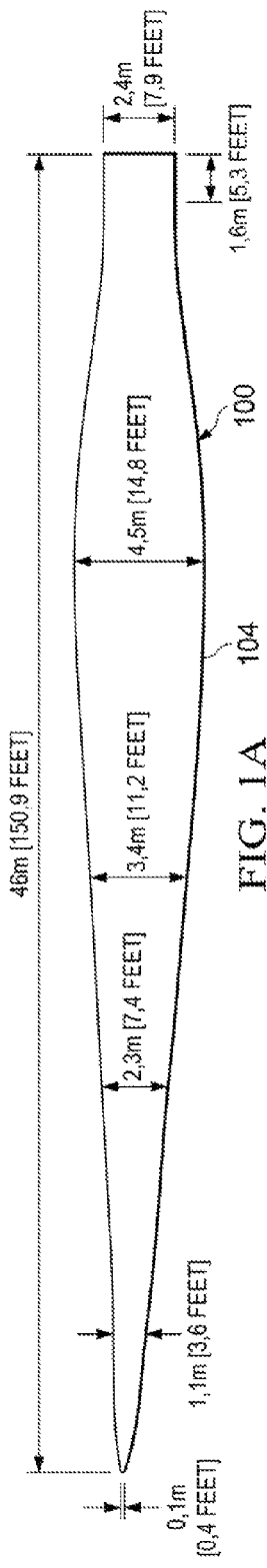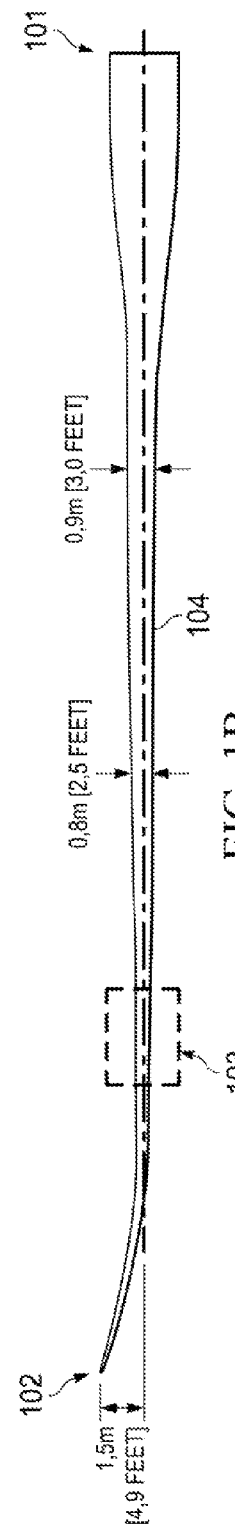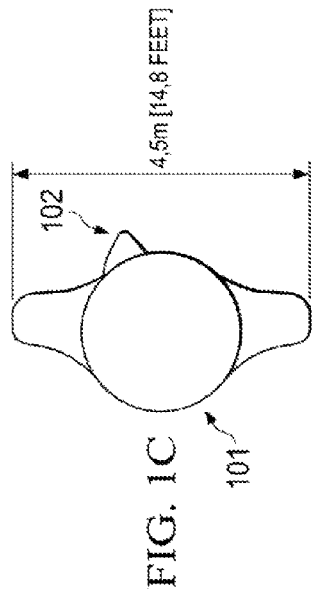

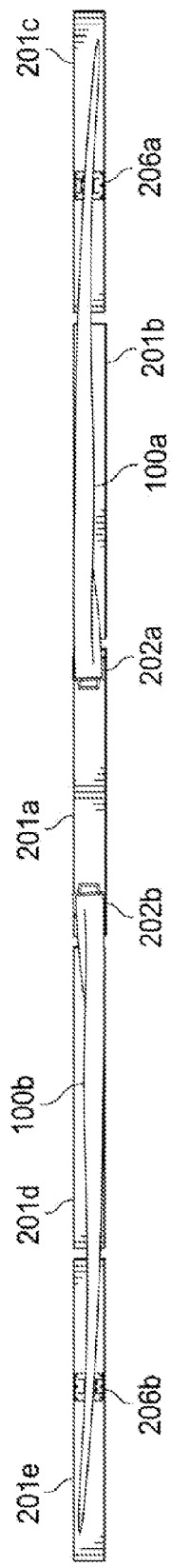

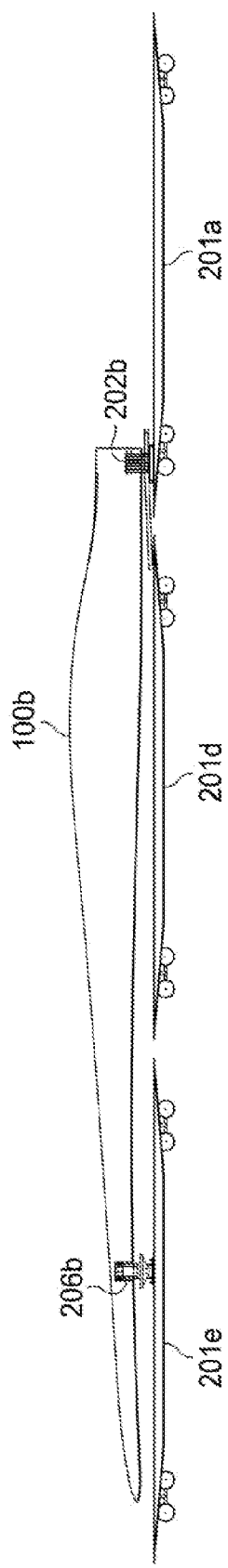

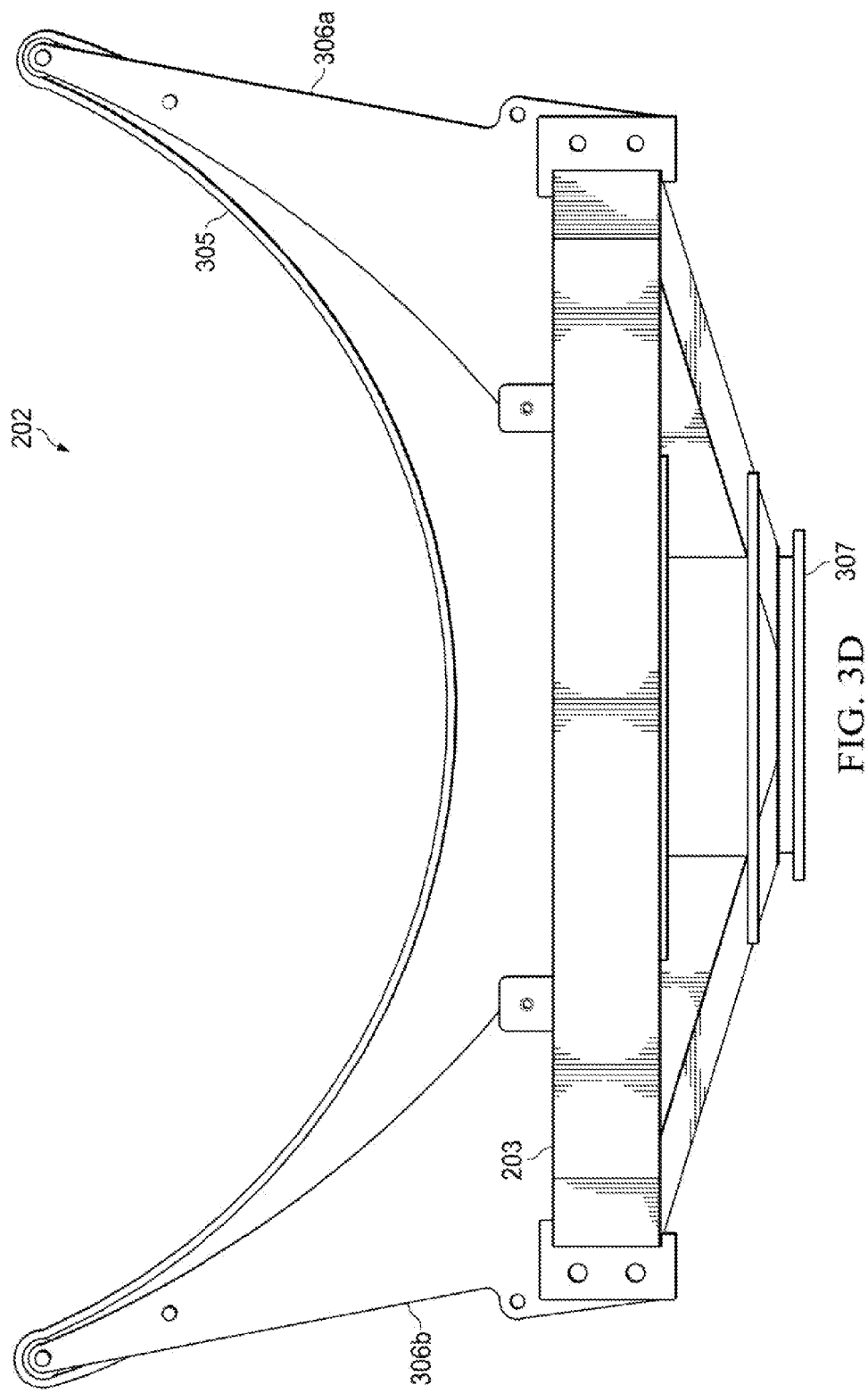

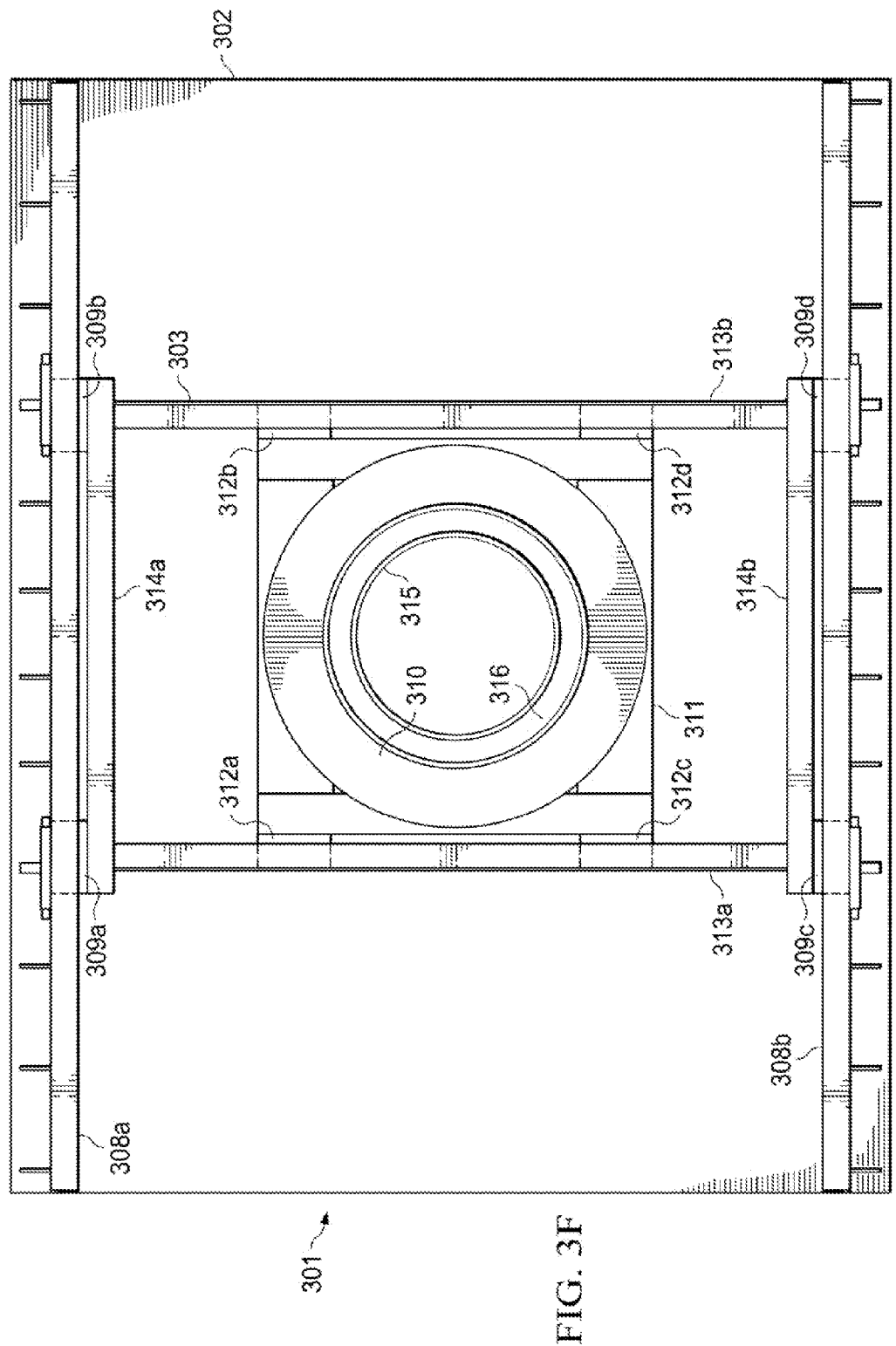

SYSTEMS AND METHODS FOR TRANSPORTING WIND TURBINE BLADES

CROSS-REFERENCE TO RELATED APPLICATION

The present application claims the benefit of U.S. Provisional Application No. 62/026,324, filed Jul. 18, 2014, which is incorporated herein by reference for all purposes.

FIELD OF INVENTION

The present invention relates in general to wind turbine blades, and in particular to systems and methods for transporting wind turbine blades by rail.

BACKGROUND OF INVENTION

Wind turbines have become an important source of electrical power worldwide. Generally, wind turbines are supported by a tower and driven by multiple wind turbine blades, each of which is typically tens of meters in length. As efforts are made to increase the amount of electrical power generated per wind turbine, the length of the wind turbine blades has also correspondingly increased.

The significant length of currently available wind turbine blades, as well as the continuing efforts to design and manufacture even longer wind turbine blades, has presented substantial challenges for those tasked with transporting wind turbine blades along the entire route from the manufacturer, through any seaports, and across country to the wind turbine farms. One particular challenging scenario is the transportation of such significantly long objects by rail.

To prevent collisions with objects in the area surrounding a railroad track, the railroads and regulatory authorities have established clearance envelopes defining the maximum distance an object can extend laterally and vertically from a railcar. The clearance envelope is typically route dependent and commonly accounts for such variables as the degree of curvature in the curves, fixed obstructions along the right-of-way (e.g., waysides, signs, and signals), track irregularities, and the type of equipment being used.

In the case of wind turbine blades, which are normally transported on one or more standard flatcars, the clearance envelope dictates the maximum swing-out the tip and/or root of the blade can extend laterally beyond the side of the supporting flatcar when the train traverses a curve. As wind turbine blades become increasingly longer, the ability to keep swing-out within the clearance envelope during rail transport becomes correspondingly more difficult. In addition to having to take into account the curvature of the curves the train is expected to encounter, a number of other variables must be considered when attempting maintain swing-out within the clearance envelope, such as vertical differences between cars as they transverse vertical slopes, the action of the couplings, and the flexing of the blade due to wind. In addition to maintaining swing-out within the clearance envelope, the structures supporting the blade on the railcars must also minimize the chance of blade damage, such as gel cracking of the shell.

SUMMARY OF INVENTION

One representative embodiment of the present inventive principles is a system for transporting a wind turbine blades, which includes a first support subsystem disposed on a first movable platform and allows a first point on the wind turbine blade to pivot in response to the first movable platform traversing a curve. A second support subsystem is disposed on a second movable platform and allows a second point on the wind turbine blade to move laterally in response to the pivoting of the first point on the wind turbine blade on the first movable platform.

Wind turbine blade transport systems embodying the present principles of the present invention divide the total swing-out of the wind turbine blade between the blade tip, the blade center section, and the blade root. Consequently, even with long or very long wind turbine blades, the lateral swing-out over the sides of the supporting transportation platform is controlled. In the case of transporting wind turbine blades by rail, by controlling the swing-out over the sides of the railcars, lateral clearance envelopes can be maintained for the given route.

Wind turbine blade transport systems according to the present invention are suitable for use in multiple applications. Among other things, these systems are scalable and can be adapted for future transportation needs as wind turbine blades continue to increase in length. In railroad applications, these systems can be used with flatcars of varying lengths, as well as with wind turbines of differing airfoil shapes and root configurations. Furthermore, the present inventive principles are not limited to rail systems nor to wind turbine blades. For example, embodiments of the principles can be adapted for use on flatbed truck trailers and/or for transporting other significantly long objects, such as pipe.

BRIEF DESCRIPTION OF DRAWINGS

For a more complete understanding of the present invention, and the advantages thereof, reference is now made to the following descriptions taken in conjunction with the accompanying drawings, in which:

FIGS. 1A-1C are respectively top, side, and end views of a generic wind turbine blade suitable for describing the principles of the present invention (the dimensions shown provide a reference as to scale and relative proportions and may vary in actual practice);

FIG. 2B is a top plan view of a pair of wind turbine blades, similar to those shown in FIGS. 1A-1B, disposed root-to-root on five rail flatcars and supported by a corresponding pair of wind turbine blade support systems, such as that shown in FIG. 2A;

FIG. 2C is a side elevational view showing one of the pair of wind turbine blades of FIG. 2B and the corresponding wind turbine blade support system;

FIG. 3D is an end elevational view of the portion of the root support subsystem of FIG. 3B showing the cradle assembly in further detail along with the associated cylindrical interface, which engages the root support system base shown in FIGS. 3E and 3F;

FIG. 3F is a top plan view of the arm support assembly of FIG. 3E;

DETAILED DESCRIPTION OF THE INVENTION

Figure 2A:
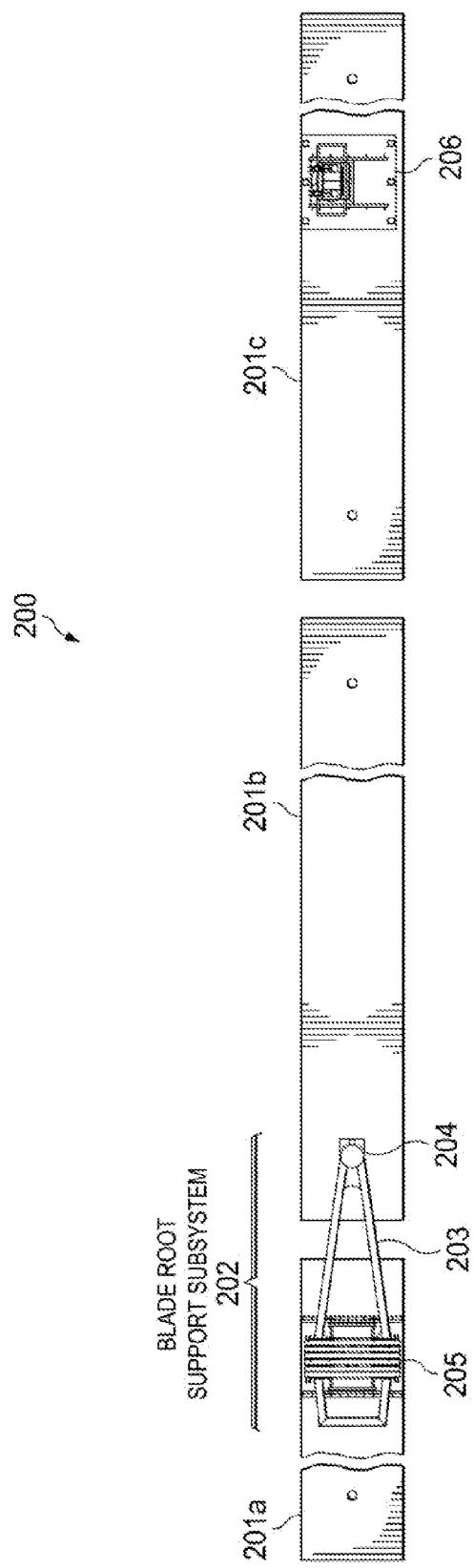
FIG. 2A is a top plan view of three flatcars forming a section of a railroad train and provide the base for a wind turbine blade support system, including a rotating blade root support subsystem and a blade tip section support subsystem, according to a representative embodiment of the present inventive principles.

The principles of the present invention and their advantages are best understood by referring to the illustrated embodiment depicted in FIGS. 1-4 of the drawings, in which like numbers designate like parts.

FIGS. 1A-1C are conceptual diagrams of a generic wind turbine blade 100 suitable for describing the principles of the present invention. Currently there are a number of wind turbine blade constructions used worldwide, although a typical wind turbine blade 100 will include a root with a cylindrical root section 101 and skin panels or shells supported by the root, which extend to a blade tip 102 and provide the surfaces of the blade airfoil. Longitudinally extending bolts (not shown) attach cylindrical section 101 to the rotor hub of the associated wind turbine (not shown). Each manufacture typically provides a reinforced blade tip section 103 for allowing wind turbine blade 100 to be secured, transported, and supported without damage to the outer shell or root. Blade tip support section 103 and blade root section 101 are spaced by blade center section 104.

Representative dimensions are shown in FIGS. 1A-1C to provide the reader with a sense of scale, although wind turbine blades of 75 meters or more are currently viable and the trend in the wind turbine industry is to use increasingly longer blades. (Generally, longer turbine blades, and increased airfoil surface area, allow for an increase in power output from the wind turbine.) Application of the principles of the present invention are generally not dependent on the particular configuration or dimensions of the wind turbine blade itself.

FIG. 2A provides a top perspective view of a section 200 of a train comprised of three adjacent empty flatcars 201a-201c including a wind turbine blade rail transport system embodying the principles of the present invention. In this example, flatcars 201a-201c are standard eight-nine foot (89') flatcars, although the present principles can be equally applied to flatcars of differing lengths, as well as to other vehicles, such as truck trailers. For example, end cars 201a and 201c may be standard eight-nine foot (89') flatcars and middle car 201b may be a standard sixty foot (60') flatcar. Alternatively, the wind turbine blade may be supported on six (6) standard sixty foot (60') flatcars.

FIG. 2B shows a pair of wind turbine blades 100a and 100b supported root-to-root on five (5) rail flat cars 201a-201e by a corresponding pair of wind turbine blade support systems according to the present principles. A side elevational view of wind turbine blade 100b, as supported by the corresponding wind turbine blade support system on rail flatcars 201a, 201d, and 201e, is provided in FIG. 2C.

As shown in FIG. 2A-2C, each wind turbine blade rail transport system includes blade root support subsystem 202 having a frame 203, kingpin assembly 204, and cradle and sled assembly 205. Kingpin assembly 204 allows frame 203 to pivot on flatcar 201b as flatcars 201a-201b traverse a curve along the route of the railroad track. Cradle and sled assembly 205 supports the weight of cylindrical blade root section 101 of the wind turbine blade 100 under transport on flatcar 201a. In concert with ARM 203 and kingpin assembly 204, cradle and sled assemble 205 also allows blade root section 101 to move laterally as leverage is applied wind turbine blade 100 as it pivots around blade tip support subsystem 206 as flatcars 201a-201c traverse curves along the route of railroad track. Furthermore, Cradle and sled assembly 205 additionally allows blade root section 101 to move longitudinally to account for differences in spacing between blade root support subsystem 202 and blade tip support system 206 during straight line and curved motion of flatcars 201a-201c A preferred embodiment of blade root support subsystem 202 is discussed below in detail in conjunction with FIGS. 3A-3F.

Blade tip support subsystem 206 supports wind turbine blade tip section 103 on flatcar 201c and allows blade tip section 103 to pivot as flatcar 201c traverses curves on the route of the railroad track. Blade tip support system 206 also allows blade tip section 103 to move longitudinally to account for, in concert with blade root support system 202, differences in spacing between blade root support subsystem 202 and blade tip support system 206 during straight line and curved motion of flatcars 201a-201c. In addition, blade tip support subsystem provides for tilting to account for vertical differences between flatcars 201b and 201c. Blade tip support subsystem 206 is discussed in detail in conjunction with FIGS. 4A-4E.

Figure 2D:
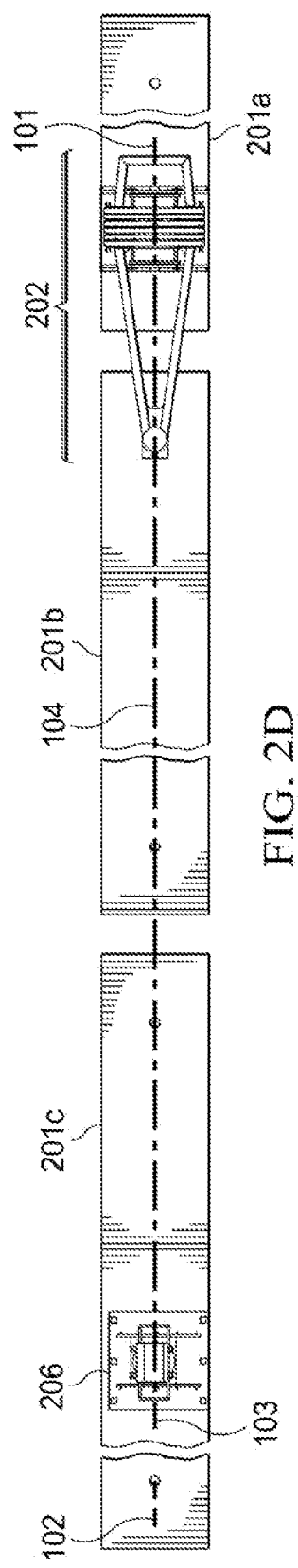
FIG. 2D is a top elevational view conceptually showing the relative disposition of the blade root support subsystem and the blade tip section support system during straight-line transport of a wind turbine blade.
Figure 2E:
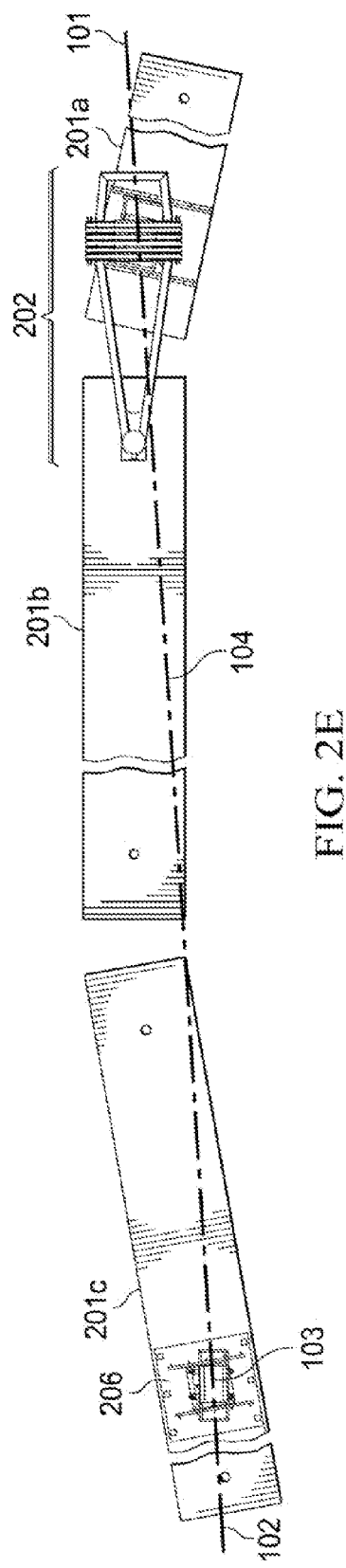
FIG. 2E is a top elevational view conceptually showing the relative disposition of the blade root support subsystem and the blade tip section support system during transport of a wind turbine blade around a curve.

The operation of blade root support subsystem 202 and blade tip section support subsystem 206 is described as follows with reference to FIGS. 2C and 2D. For clarity, the wind turbine blade is represented in FIGS. 2C and 2D by straight lines. In particular, FIG. 2C shows the relative disposition of blade root support subsystem 202, wind turbine tip section support subsystem 206, and the wind turbine blade, during straight-line travel of flatcars 201a-201c along a curved section of railroad track. FIG. 2D shows the relative disposition of blade root support subsystem 202, wind turbine tip section support subsystem 206, and the wind turbine blade, during traversal of flatcars 201a-201c along a curved section of railroad track.

Blade tip support subsystem 206 responds to movements of flatcar 201c such that blade tip 102 can swing-out towards the outside of the curve being traversed. Blade root support subsystem 202 responds to forces applied to blade 101 such that blade root section 101 swings-out towards the outside of the curve being traversed. At the same time, the center section of the wind turbine blade, acting in concert, blade root support subsystem 202 and blade tip support subsystem 206 ensure that the swing-out of blade root section 101 and blade tip 102 remains within the clearance requirements for the railroad route.

In particular, when flatcar 201c enters a curve first, wind turbine blade 100 seeks to remain straight; therefore, blade tip support subsystem 206 allows blade tip section 103 to pivot and blade tip 102 to swing out over the lateral edge of flatcar 201c towards the outside of the curve. As flatcars 201a-201c travel further into the curve, wind turbine blade 100 seeks to remain straight, which forces arm 203 of blade root support subsystem 202 to pivot around kingpin assembly 204 towards the outside of the curve and blade root section 101 to slide to the outside of the curve on cradle and sled system 205. Blade root section 101 starts to extend over the lateral edge of flatcar 201a. At the same time, center section 104 of blade 100 moves towards the inside of the curve.

Blade root support subsystem 202 and blade tip section support subsystem 206 allow the clamping point on blade tip section 103 and cradle and sled assembly 205 to move towards the ends of flatcars 201c and 201a respectively accounting for the increasing or decreasing distance between flatcars 201a and 20 as flatcars 201a-201c traverse the arc of the curve.

As flat cars 201a-201c continue to move deeper into the curve, blade tip support assembly 206 continues to allow blade tip 102 to swing outward. At the same time, kingpin assembly 204 and cradle and sled system 205 continue to allow blade root 100 to extend outward. The swing-out of blade tip 102 and blade root 101 ceases when either equilibrium is reached, for shallower curves, or when the limits imposed by the stops on blade root support subsystem 202 and blade tip support subsystem 206 are reached.

As blade root 101 and blade tip 102 continue swing-out towards the outside of the curve, center section 104 wind turbine blade 100 continues to swing towards the inside of the curve, as shown in FIG. 2D, until blade 100 reaches the stops on blade root support system 202 and blade tip section support system 206, or the system is in equilibrium. The total swing-out is therefore divided between blade tip 102, blade root section 101, and the lateral offset of blade center section 104 from the centerline of middle flatcar 201b. Consequently, both blade tip 102 and blade root 101 remain within the lateral clearance requirements for the given train route as flatcars 201a-201c traverse the curve.

In sum, the total swing-out is a function of the curvature of the curve and the stops provided in blade root support subsystem 202 and blade tip section support subsystem. For curves with a flatter arc, the swing-out of blade tip 102 and blade root 101 will be less than the swing-out on curves with a greater arc. The maximum swing-out of blade tip 102, and the pivoting around the pivot point of blade tip support section is controlled 206, is controlled by the wind turbine blade itself, while the absolute maximum swing-out of blade root 101 is controlled by the maximum lateral travel allowed by blade root support subsystem 202. (On typical routes, the maximum curvature encountered is below 10°, although in switching yards and ports, the maximum curvature may be on the order of 17°. The absolute maximum on any route is in the range of 20 to 25°, although on these routes, shorter flatcars may be required and/or the length of the wind turbine blades transported may be limited.

As flatcar 201c completes the traversal of the curve and the arc of the curve begins to shallow wind, turbine blade 100 seeks to remain straight and tip support subsystem 206 allows blade tip section 103 to begin to pivot, which brings blade tip 102 inward towards the centerline of flatcar 201c.

As flatcars 201b and 201a complete traversal of the curve and the arc of the curve begins to shallow wind turbine, blade 100 forces arm 203 to pivot inward on kingpin assembly 204 and cradle and sled assembly 205 to slide inward along with wind turbine blade root 101.

Blade tip support subsystem 206 continues to allow blade tip section 103 to pivot until blade tip 102 is substantially in longitudinal alignment with flatcar 201c and arm 203 continues to pivot inward and cradle and sled assembly 205 continues slide inward, until blade root 101 is substantially in longitudinal alignment with flatcars 201a-201b. Blade root support subsystem 202 and blade tip support subsystem 206 allow the clamping point on blade tip section 103 and cradle and sled assembly 205 to move away from the ends of flatcars 201c and 201a, respectively, to account for the increasing and decreasing distance between blade root support subsystem 202 and blade tip support subsystem 206 as flatcars 201a-201c exit the curve.

When blade root 101 on flatcar 201a enters the curve first, a similar process takes place. Wind turbine blade 101 seeks to remain straight, which forces arm 203 to pivot outward around kingpin assembly 204 and blade root section 101 to slide outward on cradle and sled assembly 205. Blade center section 104 begins to move inward towards the inside of the curve. As flatcar 201c enters the curve, blade tip section 103 begins to allow blade tip section 103 to pivot in response to the movement of flatcar 201c, which swings blade tip 102 outward. The longitudinal motion allowed by blade tip support subsystem 206 and cradle and sled assembly 205 account for the increasing and/or decreasing spacing between them.

As flatcars 201a and 201c continue to traverse the curve, arm 203 continues to pivot outward, cradle and sled assembly 205 continues to slide outward, and blade tip support subsystem 206 continues to pivot, until the outward extension of blade root section 101 and blade tip 102, and the inward motion of blade center section 104, either reach their allowable maximums or the system is in equilibrium.

As flatcar 201a starts to exit the curve, arm 203 begins to pivot inward on kingpin assembly 204 and blade root 101 slides inward on cradle and sled assembly 205, which brings blade root 101 inward. Blade tip support subsystem 206 allows blade tip section 103 to start pivoting inward as flatcar 201c starts to exit the curve, which brings wind turbine blade tip 102 inwards.

Arm 203 continues to pivot inward and cradle and sled assembly 205 continues slide inward until blade root section 101 is substantially in longitudinal alignment with flatcars 201a. Blade tip support subsystem 206 continues to allow blade tip section 103 to pivot bringing blade tip 102 towards the center of flatcar 201c with flatcar 201c center blade section 104 moves inwards towards the center line of flatcar 201b. The longitudinal motion allowed by blade tip support subsystem 206 and cradle and sled assembly 205 account for the decreasing and/or increasing spacing between them as flatcars 201a-201c begin to travel on straight railroad track.

In addition to controlling the swing out of blade tip 102 and blade root 101 during the traversal of curves, blade tip support subsystem 206 and blade root support system 202 also absorb stresses on wind turbine blade 101 during the continuous movement of flatcars 201a-201c along the track, as well as during stops, starts, and changes in speed of the train. In other words, the wind turbine blade transport system relieves stresses on the wind turbine blade cause by jarring and similar forces imposed on the flatcars, which could potentially damage the wind turbine blade.

Figure 3A:
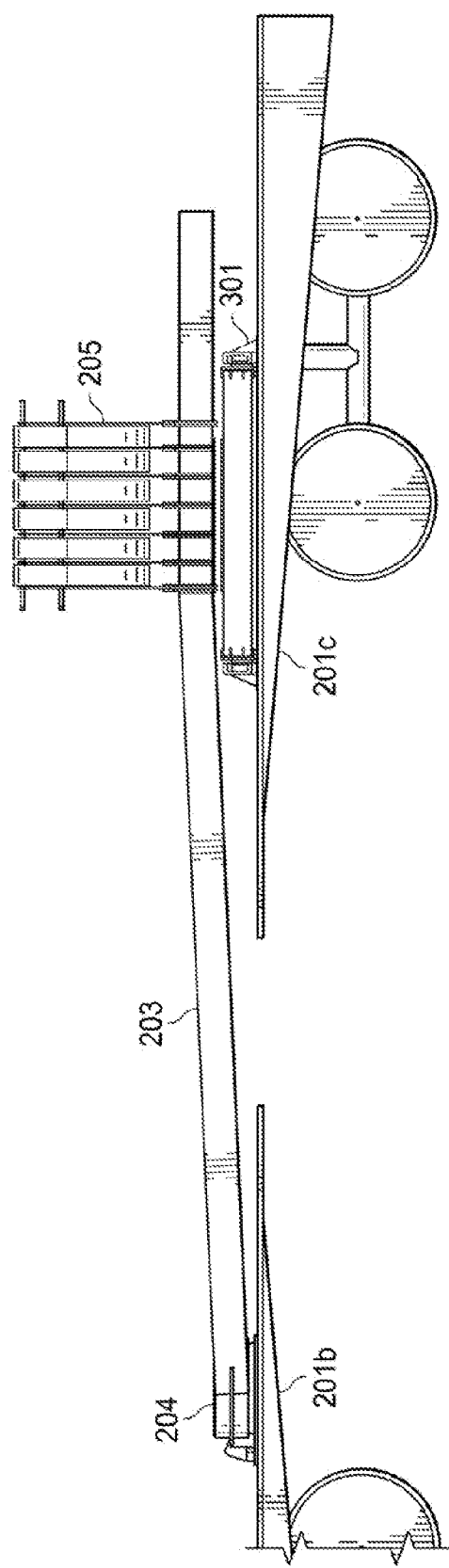
FIG. 3A is a side elevational view of the blade root support subsystem, including the arm, kingpin assembly, and cradle assembly, of FIG. 2A.

FIG. 3A is a side elevational view showing blade root support subsystem 202 of FIG. 2A in further detail. As discussed above, blade root support subsystem 202 includes an arm 203, having a first end that pivots around a kingpin assembly 204 disposed near the end of flat car 201b. Arm 203, which spans the gap between flatcars 201b and 201c, has a second end that supports cradle and sled assembly 205. An arm support assembly 301 supports the second end of arm 203 and cradle and sled assembly 205. As discussed further in conjunction with FIGS. 3E and 3F, arm support assembly 301 includes a fixed base 302 welded to flatcar 201c and a multi-directional carriage (sled) assembly 303 supported by fixed base 302.

Figure 3B:
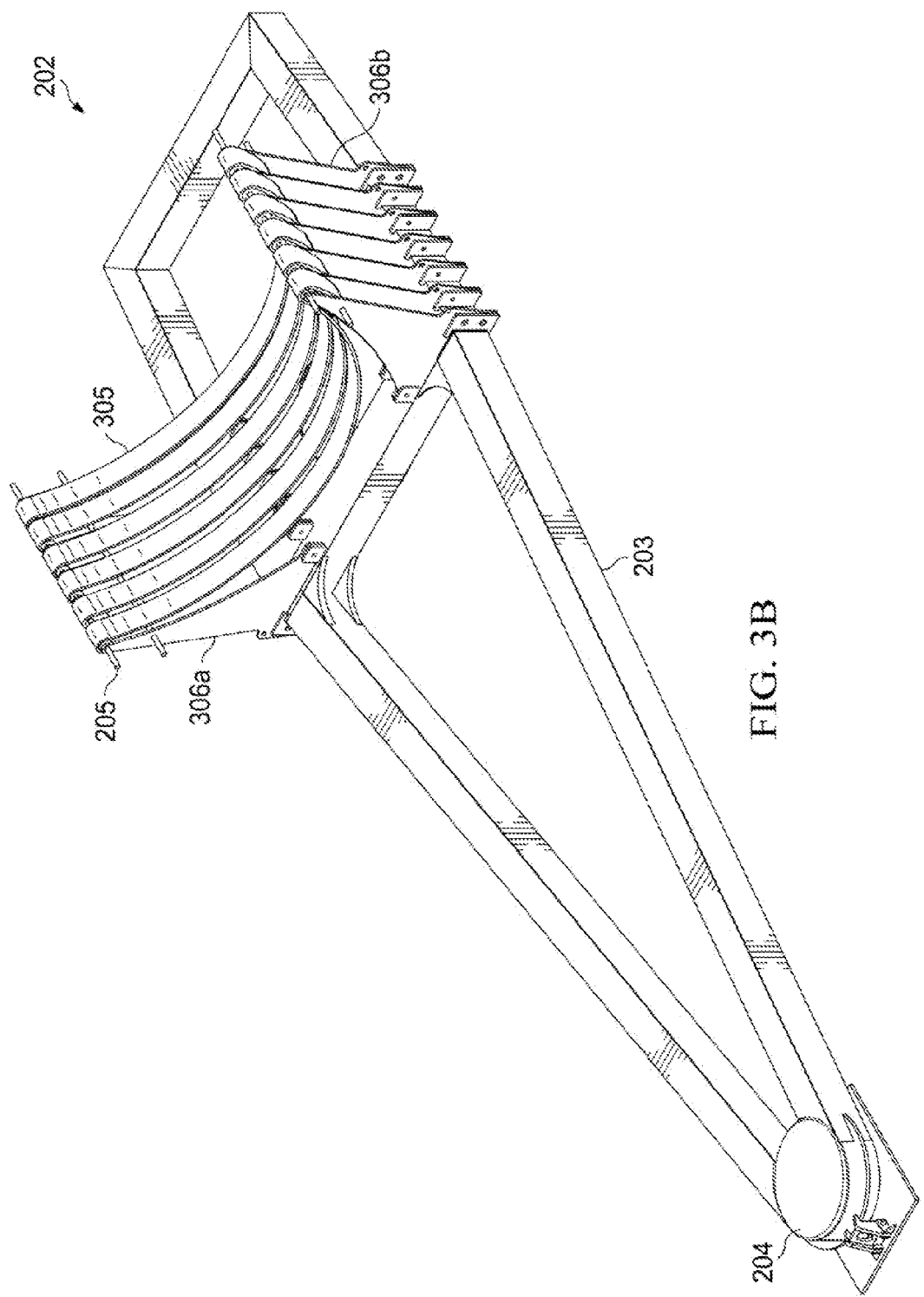
FIG. 3B is a perspective view of a portion of the blade root support subsystem, including the kingpin assembly, arm and cradle assembly shown in FIG. 2A.
Figure 3C:
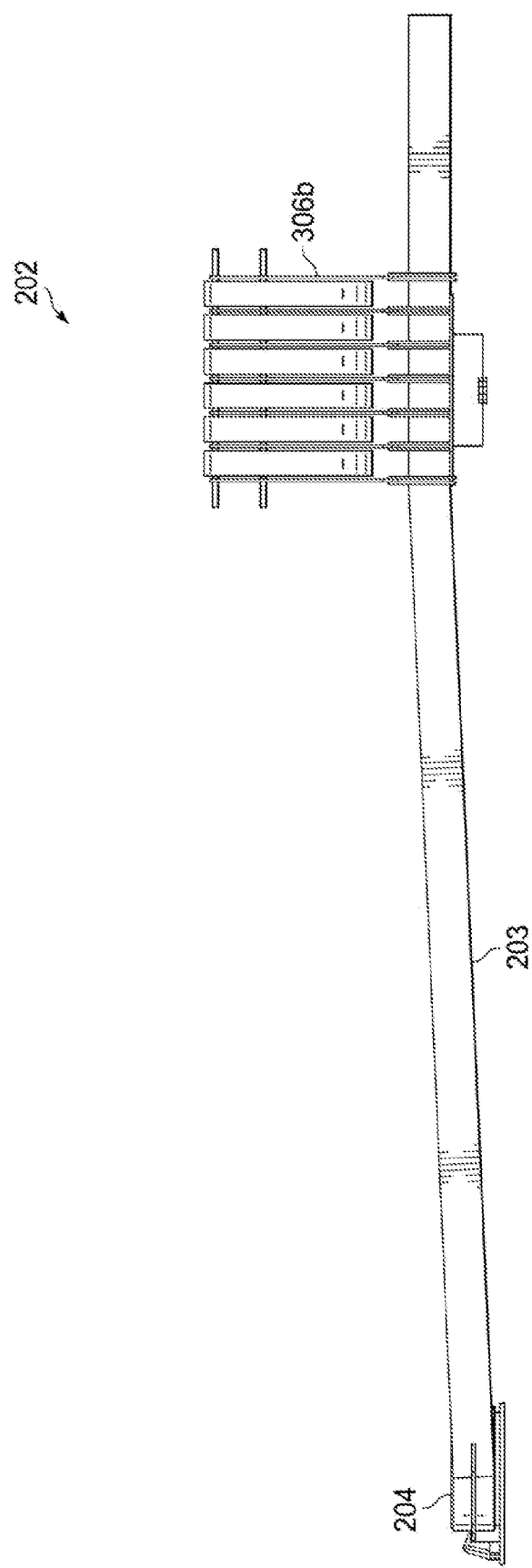
FIG. 3C is an side elevational view of the kingpin assembly, frame, and cradle assembly of the root support system shown in FIG. 3B.

FIG. 3B provides a more detailed prospective view of the portion of blade root support subsystem 202 including arm 203, kingpin assembly 204, and cradle and sled assembly 205. A corresponding elevational side view is shown in FIG. 3C. Arm 203, which is preferably constructed of steel beams, rotates around kingpin assembly 204 on flatcar 201b. The cradle portion of cradle and sled assembly 205 includes a set of straps 305 supported by opposing sets of ribs 306a and 306b extending from arm 203. Straps 305 and ribs 306 are dimensioned to receive cylindrical blade root section 101 of the wind turbine blade 100 being transported.

The elevational end view of FIG. 3D shows a cylindrical interface 307, which mates with a corresponding projection 315 and flange 310 on sled assembly 303, discussed below in conjunction with FIG. 3E. Cylindrical interface 307 is disposed directly underneath the cradle provided by straps 305 and ribs 306 and allows minor rotation of arm 203 for reducing stresses on sled assembly 303, although the primary motion of the cradle is in the form of pivoting around kingpin assembly 205 and lateral and longitudinal sliding by sled assembly 303.

Figure 3E:
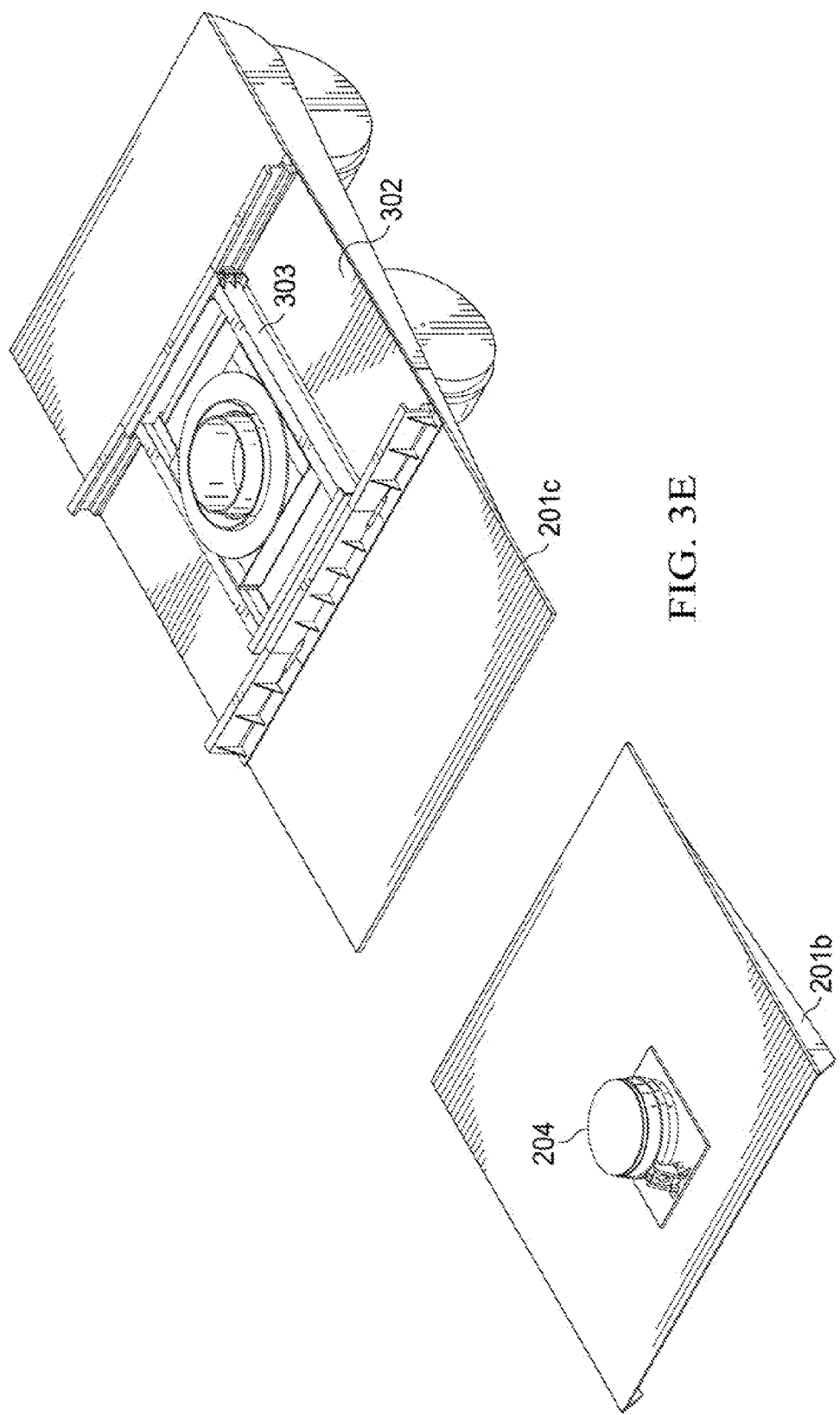
FIG. 3E is a perspective view of the kingpin and arm support assembly of the blade root support subsystem of FIG. 3A, shown with the arm end cradle assembly removed.

FIG. 3E is a top perspective view showing fixed base 302 and sled assembly 303 of arm support assembly 301, with arm 203 and the cradle of cradle and sled assembly 205 removed. Also shown in kingpin 304 of kingpin assembly 204.

Arm support assembly 301 is shown in further detail in the top plan view of FIG. 3F. Fixed base 302 includes a pair of substantially parallel rails 308a-308b, which allow sled assembly 303 to move laterally in response to leverage applied to blade turbine root 101 by wind turbine blade 100, as discussed above. In particular, a set of bearings 309a-309d, which extend from end frame members 314a-314b of sled assembly 303, move within slots within rails 308a-308b to provide lateral sliding of blade root 101.

Sled assembly 303 also includes a cylindrical flange 310 supported on a rectangular base 311. Cylindrical flange 310 and rectangular base 311 move on bearings 312a-312d, which extend into slots in substantially parallel rails 313a-313b, to provide the longitudinal movement described above for accounting for changes in spacing between flatcars 201a-201c. Rails 313a-313b are supported by end members 314a-314b.

A projection or kingpin 315 is spaced from flange 310 by a gap 316 and extends upward for reception in the barrel of flange 307 of FIG. 3D. The surface of flange 307 is supported on the surface of flange 310, which allows some rotation of arm assembly 301 and the reduction of stresses on bearings 309a-309d and 312a-312d.

Figure 4A:
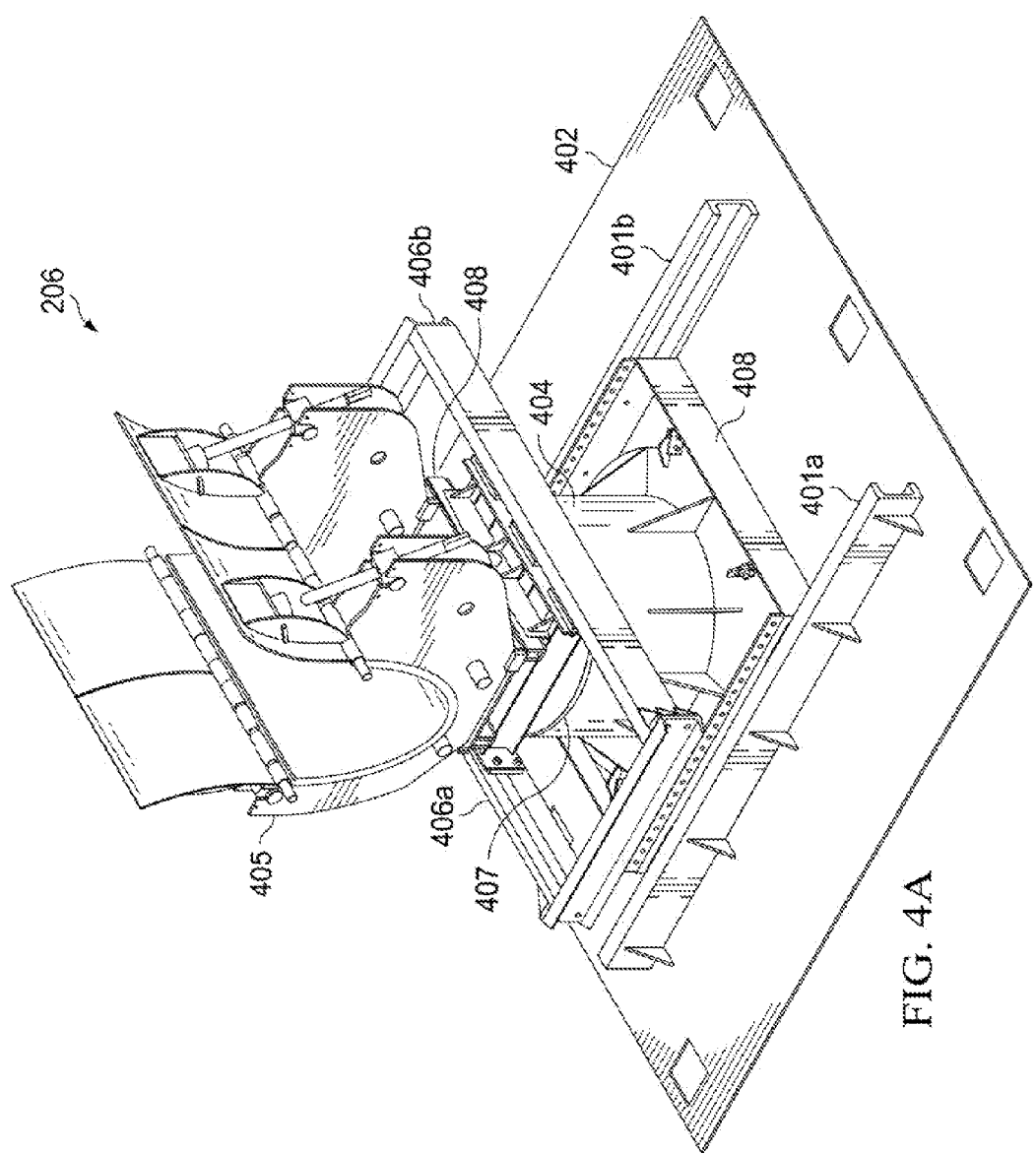
FIG. 4A is a top perspective view of the blade tip support subsystem shown in FIG. 2A.

FIG. 4A is a perspective view of blade tip section support subsystem 206, which is mounted on the deck 402 of flatcar 201c. A corresponding top plan view is provided in FIG. 4B. A pair of rails 401a and 401b allow for the support assembly, including rectangular base 403 and cylindrical base 404, to be laterally adjusted on flatcar deck 402 for positioning blade tip section 103. (Once adjusted, rectangular base 403 and cylindrical base 404 are locked into place on rails 401a-401b.)

A clamping assembly 405 moves longitudinally along a pair of rails 406a-406b on a carriage 408, which accounts for differences in spacing between blade tip support subsystem 206 and blade root support subsystem 202 during motion on straight and curved sections of railroad track. Clamping assembly 405 and rails 406a-406b pivot around surface 407 with respect to cylindrical base 404 to provide the swing-out of the blade tip discussed above.

Figure 4B:
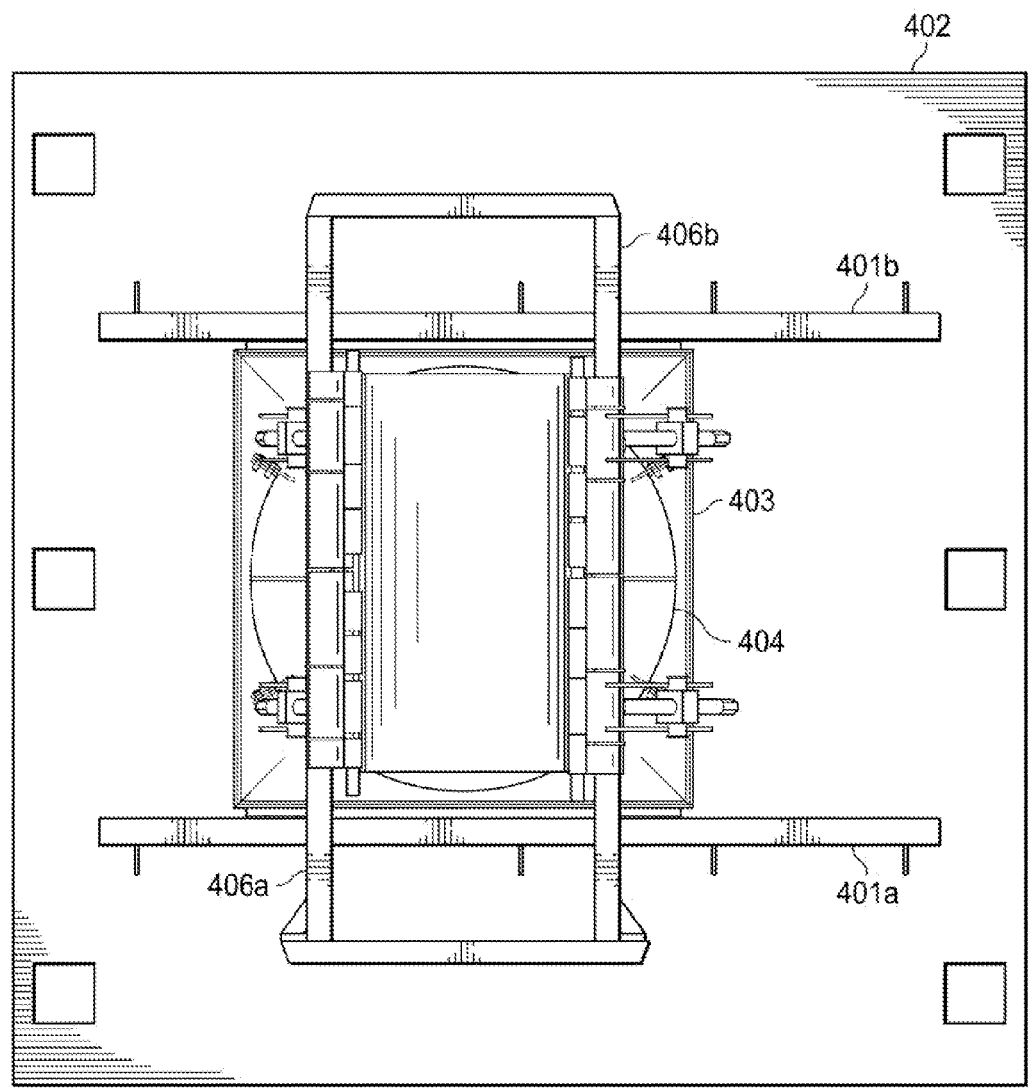
FIG. 4B is a top plan view of the blade tip support subsystem shown in FIG. 2A.
Figure 4C:
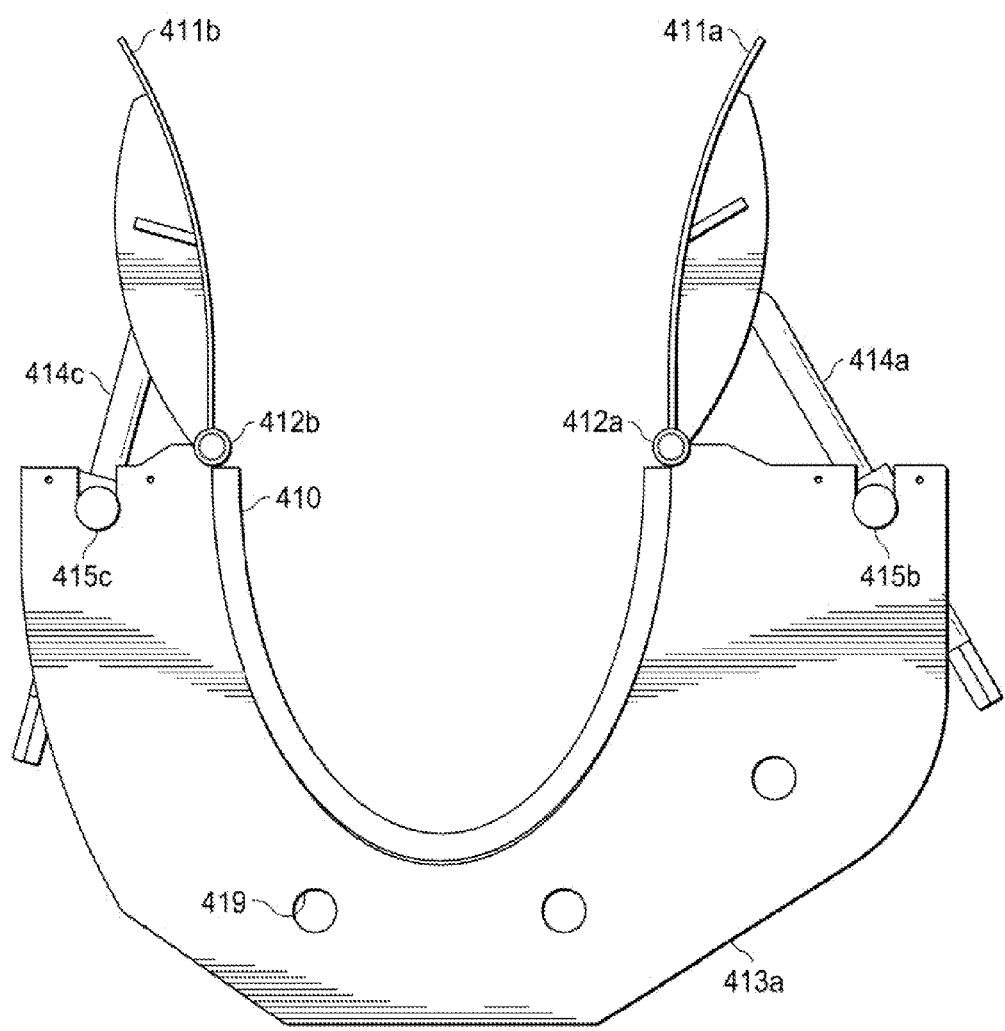
FIG. 4C is an end elevational view of the blade tip section clamping assembly shown in FIGS. 4A and 4B.

FIG. 4C is an end elevational view of one of two symmetrical ends of clamping assembly 405 shown of FIGS. 4A and 4B. Corresponding side elevational and top plan views of clamping assembly 405 are respectively shown in FIGS. 4D and 4E.

Clamping assembly 405 includes a steel U-shaped receptacle 410, which is adapted to receive the edge of the reinforced tip section 103 of the corresponding wind turbine blade 100. U-shaped receptacle 410 is supported by steel U-shaped ribs 413a-413d.

Figure 4D:
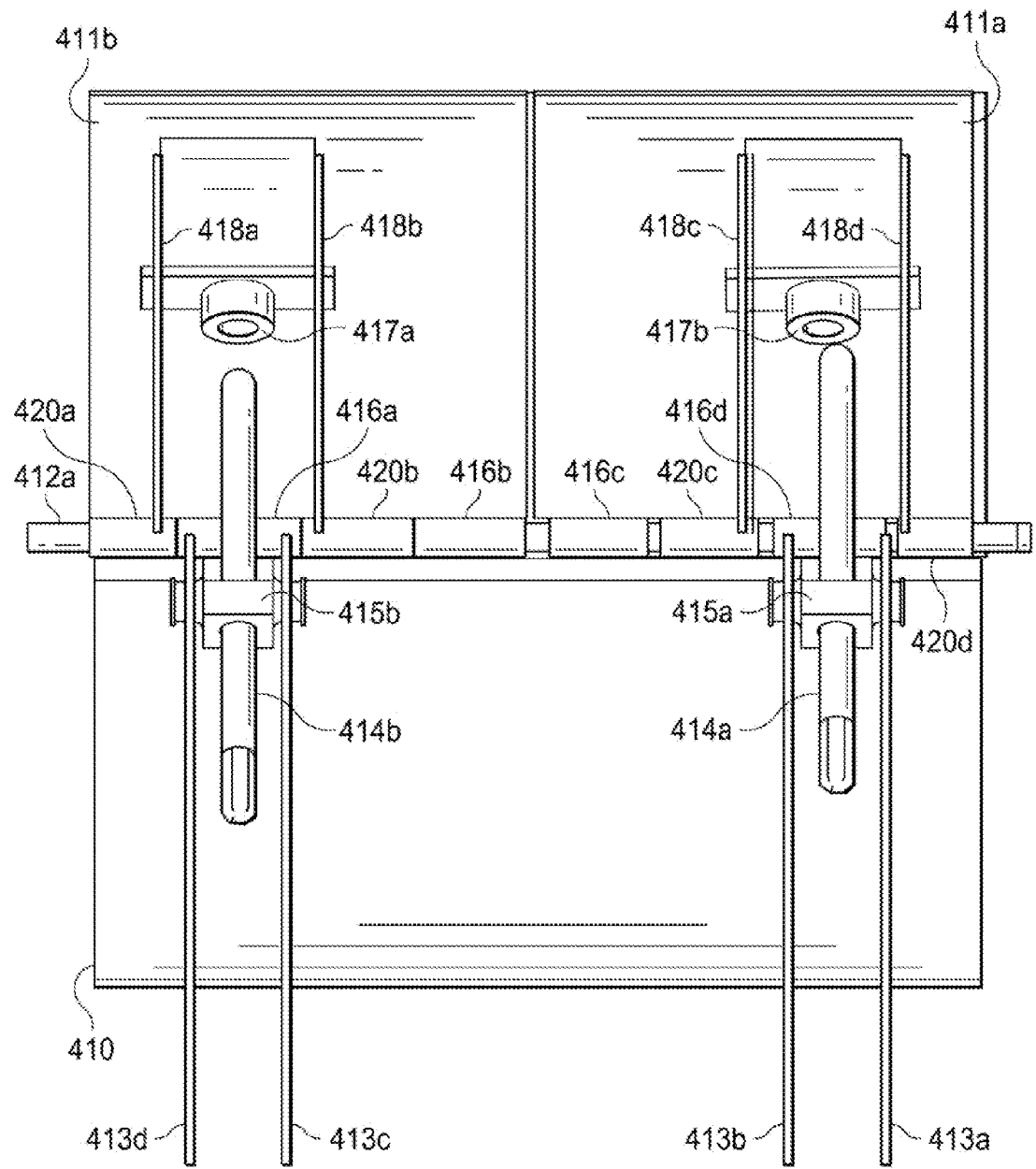
FIG. 4D is a side elevational view of one side of the blade tip section clamping assembly shown in FIGS. 4A and 4B.

Two opposing pairs of opposing flaps 411a-411b and 411c-411d extend from the upper edges of U-shaped receptacle 410 and are supported by corresponding pairs of ribs 418a-418b and 418c-418d, as shown in FIG. 4D.

Flaps 411a-411d and corresponding support structures 418a-418b rotate around a corresponding pair of hinges formed by shafts 412a-412b, and sets of tubes 416a-416d and 420a-420d.

In particular, shafts 412a-412b rotate within tubes 416a-416d, which are fixed along the upper edges of an U-shaped liner 417 and U-shaped ribs 413a-413d. Tubes 420a-420d are fastened to the lower edges of flaps 411a and 411b and rotate along with shafts 412a-412b.

Flaps 411a-411b pivot in response to torque applied to threaded screws 414a-414d. In the illustrated embodiment, flap 411a pivots in response to torque applied to threaded screws 414a and 414b, which respectively move through the threaded bores of nuts 415a and 415b supported by slots formed in the ends of U-shaped ribs 413a-413d (see FIGS. 4B and 4C). Similarly, flap 411b pivots in response to torque applied to threaded screws 414c and 414d, which respectively move through the threaded bores of nuts 415c and 415d supported by slots formed in the opposite ends of U-shaped ribs 413a-413d).

Bolt holes 419 though the lower portions of ribs 413a-413d allow blade tip support assembly 207 to be bolted to the underlying carriage 408 of FIG. 4A.

FIG. 4D is a end plan view of representative blade tip support assembly 207a in the open position, which allows edge of the associated reinforced turbine blade tip section 103 to be inserted and removed from U-shaped receptacle 410. In the open position, flaps 411a and 411d have been retracted using threaded screws 414a-414b.

Figure 4E:
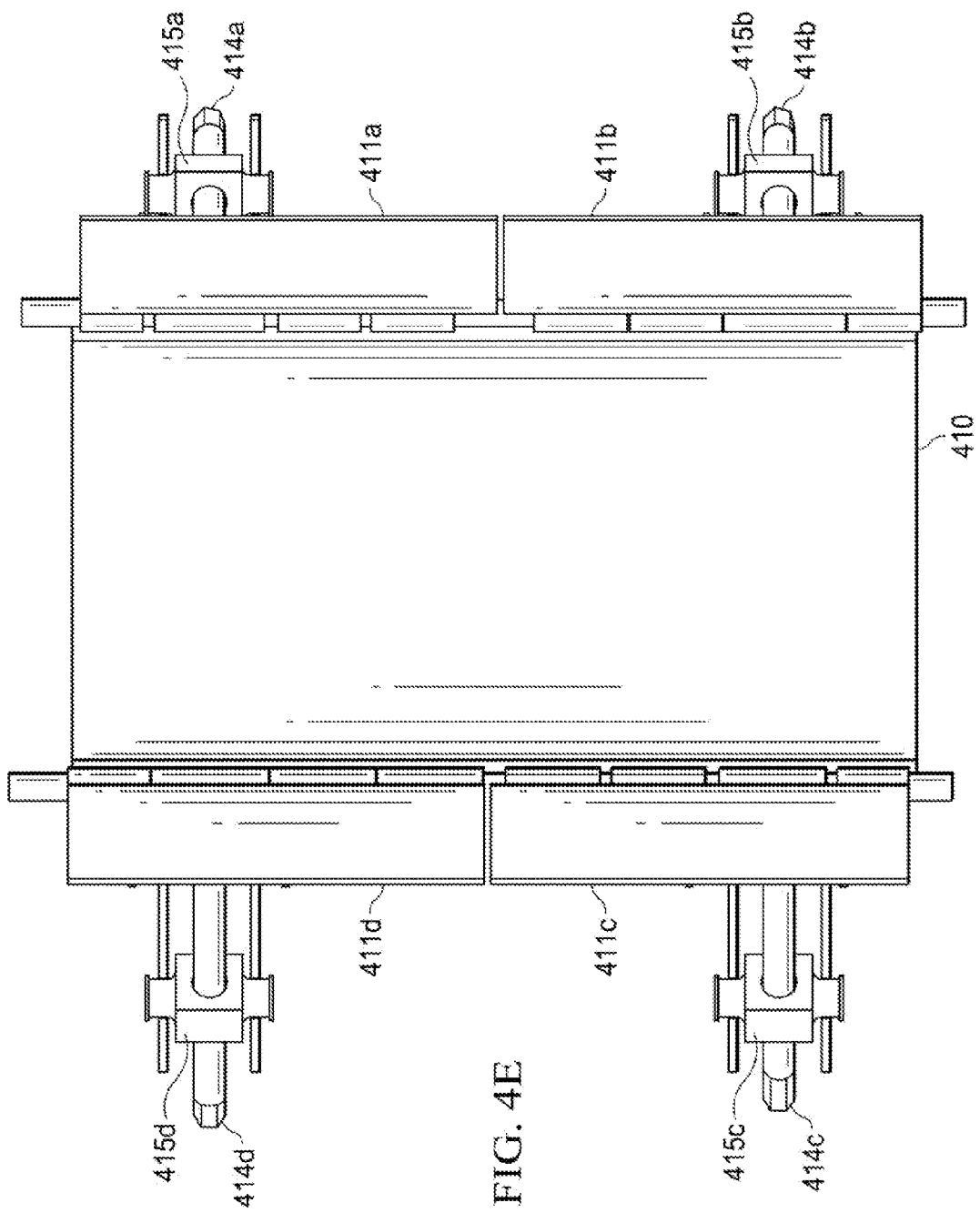
FIG. 4E is a top plan view of the blade tip section clamping assembly shown in FIGS. 4A and 4B.

FIG. 4E is a end plan view of the opposing end of representative blade tip support assembly 207a in the closed position, which allows flaps 411a-411b to contact corresponding surfaces of the corresponding reinforced turbine blade tip section 103 and retain and stabilize that reinforced turbine blade tip section 103 within U-shaped receptacle 410. (The wind turbine blade tip section 103 is not shown in FIG. 4E for clarity.) In the closed position, flaps 411a and 411b have contracted towards the surfaces of the wind turbine blade using threaded screws 414a-414b.

Wind turbine blade transportation systems embodying the principles of the present invention allow for the transportation of very long structures, such as wind turbine blades, by rail or truck. In particular, these systems ensure that the maximum swing-out of the blade tip, the blade root, or both, over the lateral boundaries of the transportation platform remains within the lateral clearance envelope for the chosen route. Advantageously, systems embodying the present inventive principles are generally scalable, which will address the needs of transportation as the length of the wind turbine blades themselves continues to grow.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A system for transporting a wind turbine blade comprising:
   a first support subsystem disposed on a first movable platform and operable to allow a first point on the wind turbine blade to pivot in response to the first movable platform traversing a curve; and
   a second support subsystem at least partially disposed on a second movable platform spaced from the first movable platform and operable to allow a second point of the wind turbine blade to move laterally in response to the pivoting of the first point on the wind turbine blade on the first movable platform, wherein the second support subsystem comprises:
      an arm operable to pivot in response to pivoting of the first point on the wind turbine blade on the first movable platform;
      a cradle supported by the arm and supporting the second point of the wind turbine blade; and
      a sled for supporting an end of the arm and the cradle and operable to allow the cradle and the end of the arm to slide in response to pivoting of the first point on the wind turbine blade on the first movable platform.

2. The system of claim 1, wherein the first support subsystem is further operable to allow a first end of the wind turbine blade to swing-out over an edge of the first movable platform by a predetermined amount in response to a corresponding amount of curvature of the curve.

3. The system of claim 2, wherein the second support subsystem is further operable to allow a second end of the wind turbine blade to swing-out over an edge of the second movable platform by a predetermined amount in response to a corresponding amount of curvature of the curve.

4. The system of claim 1, wherein the first and second movable platforms comprise first and second railcars forming a part of a railroad train.

5. The system of claim 4, wherein the first and second movable platforms are spaced by a third railcar coupled between the first and second railcars.

6. The system of claim 1, wherein the second support subsystem is operable to allow the second point of the wind turbine blade to slide laterally in response to the wind turbine blade pivoting around the first point on the first movable platform.

7. The system of claim 3, wherein the first end of the wind turbine blade comprises a blade tip and the second end of the wind turbine blade comprises an end of a blade root.

8. The system of claim 1, wherein the first support subsystem is further operable to allow the first point to move longitudinally in response to changes in spacing between the first and second movable platforms during traversal of the curve.

9. The system of claim 1, wherein the second support subsystem is further operable to allow the second point to move longitudinally in response to changes in spacing between the first and second movable platforms during traversal of the curve.

10. The system of claim 1, wherein the first support subsystem comprises:
    a base assembly disposed on the first movable platform;
    a clamping assembly coupled to the base assembly and operable to clamp the wind turbine blade at the first point and to pivot with respect to the base assembly.

11. The system of claim 10, wherein the first support subsystem further comprises a set of rails on which the clamping assembly is disposed, the set of rails pivoting with the clamping assembly with respect to the base assembly and operable to allow the clamping assembly to move linearly to account for changes in spacing between the first and second movable platforms during traversal of the curve.

12. The system of claim 5, wherein the arm pivots around a pivot point on the third railcar and the sled is disposed on the second railcar.

13. A system for transporting a wind turbine blade comprising:
    a first support subsystem disposed on a first rail car and operable to allow a first point on the wind turbine blade to pivot in response to the first railcar traversing a curve; and
    a second support subsystem at least partially disposed on a second rail car spaced from the first railcar by a third railcar, the second support subsystem operable to allow a second point of the wind turbine blade to move laterally in response to the pivoting of the first point on the wind turbine blade on the first railcar.

14. The system of claim 13, wherein the second support subsystem comprises:
    an arm operable to pivot in response to pivoting of the first point on the wind turbine blade on the first railcar;
    a cradle supported by the arm and supporting the second point of the wind turbine blade; and
    a sled for supporting an end of the arm and the cradle and operable to allow the cradle and the end of the arm to slide in response to pivoting of the first point on the wind turbine blade on the first railcar.

15. The system of claim 14, wherein the arm pivots around a pivot point on the third railcar and the sled is supported by the second railcar.

16. The system of claim 13, wherein the first support subsystem is further operable to allow a first end of the wind turbine blade to swing-out over an edge of the first railcar by a predetermined amount in response to a corresponding amount of curvature of the curve.

17. The system of claim 16, wherein the second support subsystem is further operable to allow a second end of the wind turbine blade to swing-out over an edge of the second railcar by a predetermined amount in response to a corresponding amount of curvature of the curve.

18. The system of claim 13, wherein the first support subsystem comprises:
   a base assembly disposed on the first railcar;
   a clamping assembly coupled to the base assembly and operable to clamp the wind turbine blade at the first point and to pivot with respect to the base assembly.

19. The system of claim 18, wherein the first support subsystem further comprises a set of rails on which the clamping assembly is disposed, the set of rails pivoting with the clamping assembly with respect to the base assembly and operable to allow the clamping assembly to move linearly to account for changes in spacing between the first and second railcars during traversal of the curve.

* * * * *